G. W. LOCKHART.
HARROW ATTACHMENT FOR DISK HARROWS.
APPLICATION FILED JUNE 23, 1916.
1,332,049.
Patented Feb. 24, 1920.
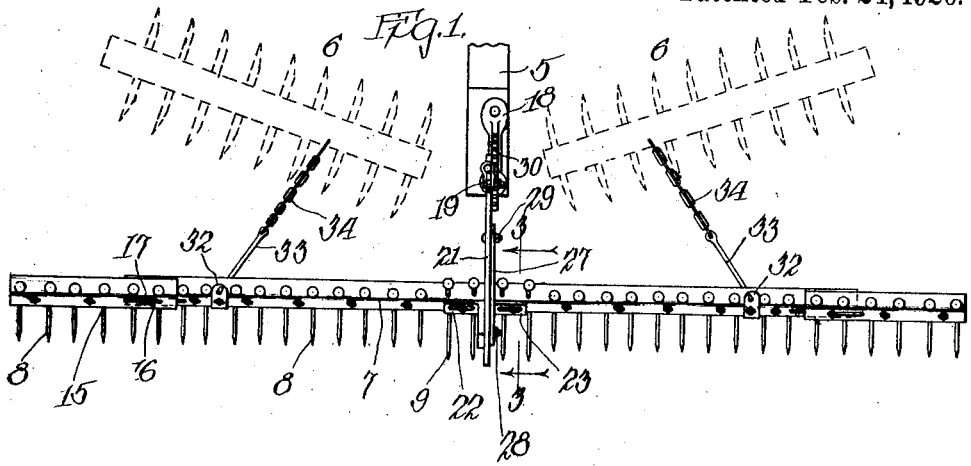
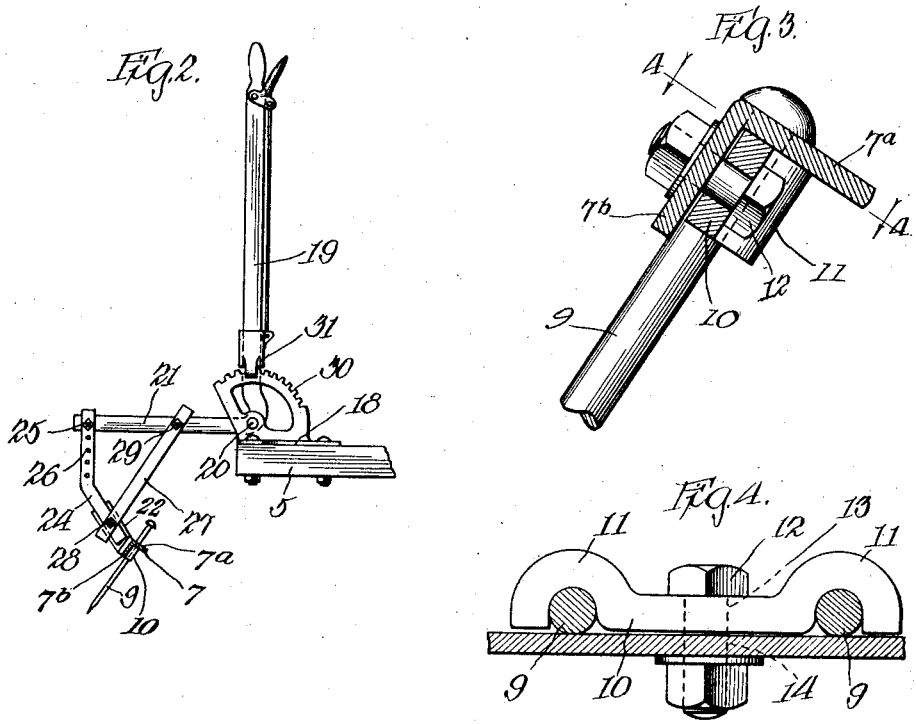

UNITED STATES PATENT OFFICE.

GEORGE W. LOCKHART, OF WELLINGTON, ILLINOIS.

HARROW ATTACHMENT FOR DISK HARROWS.

1,332,049.

Specification of Letters Patent.  Patented Feb. 24, 1920.

Application filed June 23, 1916. Serial No. 105,359.

*To all whom it may concern:*

Be it known that I, GEORGE W. LOCKHART, a citizen of the United States, residing at Wellington, in the county of Iroquois and State of Illinois, have invented certain new and useful Improvements in Harrow Attachments for Disk Harrows, of which the following is a specification.

The disk harrows in connection with which my improvement is intended to be used commonly comprise a frame in which one or more pairs of shafts are pivoted in a line transverse to the direction of movement of the harrow, each shaft carrying a number of disks for working the ground. The shafts may be set at varying angles, though commonly where but a single pair of disk shafts is employed they are set to incline inwardly and rearwardly so that the action of the disks in breaking up the ground also has a tendency to feed the loose earth outwardly toward the ends of the harrow. Where two sets of disks are employed arranged one in front of the other, the front disk shafts are commonly inclined rearwardly and outwardly while the shafts of the rear pair are inclined as heretofore described, whereby the earth is moved outward, and there is a tendency to form more or less of a trough or depression along the line traversed by the center of the harrow. The disk shafts of such harrows vary in length and moreover the effective width of the harrow is varied by varying the angle of inclination of the disk shafts. There is a narrow band traversed by the center of the harrow which is not reached by the disks on either side of the harrow, and which requires working, and furthermore there is a tendency to form a strip or ridge of coarser material at the outer ends of the series of disks.

It is the object of my invention to provide a tooth harrow attachment for disk harrows of the above description, which will act upon the ground in the immediate rear of the disks and further pulverize the soil and work out the irregularities, lumps, etc., to which reference has been made.

In the accompanying drawings I have shown and in the following specification described in detail a preferred embodiment of my invention. It is to be understood, however, that the specific disclosure is for the purpose of exemplification only, the scope of the invention being defined in the following claim in which I have endeavored to distinguish it from the prior art so far as known to me without, however, relinquishing or abandoning any portion or feature thereof.

Referring to the drawings Figure 1 is a plan of my harrow attachment, so much of a harrow disk to which it is attached being shown as is necessary for an understanding of the construction; Fig. 2 is a side elevation thereof; Fig. 3 a section on an enlarged scale on the line 3—3 of Fig. 1, and Fig. 4 a section on the line 4—4 of Fig. 3.

The same reference character is applied to each part wherever it appears in the several views.

In Figs. 1 and 2 the central beam of a disk plow, which is adapted to receive my attachment, is shown at 5, and the disks and disk shafts, or the rear set thereof, shown in dotted lines at 6, 6. The attachment comprises a main beam 7 which is formed of angle iron, as best seen in Fig. 3, and one leaf $7^a$ thereof is pierced by a longitudinal series of holes in which pins or teeth 8, 9, are secured. The pins are held in position by means of double clamps 10, (see Fig. 4) there being one such clamp to each pair of pins, and said clamp consists of a short strap-iron tie or bar, the ends of which are bent into semi-circular form, as at 11, to engage the shafts of the pins, a bolt 12 extending through a perforation 13 in the center of each clamp, and through an aperture 14 in the other leaf $7^b$ of the angle iron whereby said pins are firmly secured in position. The outer pins 8 on both sides of the center of the beam are of a common length, but the intermediate pins 9 are somewhat longer so that they may be adjusted with reference to the beam to project more or less from the under face thereof, and therefore engage the ground more or less deeply. The longer pins are provided at this point, because of the formation of a trough, groove or depression heretofore mentioned, in which these pins work, and because of the fact that this intermediate strip is not worked by the disks of the main harrow body. At its ends the harrow beam 7 is provided with extensions 15, which are of the same formation as the main beam and are also provided with harrow pins 8, the extensions being adjustable with reference to the main beam by means of slots 16 formed in the beams and bolts 17 with nuts thereon by which the parts are clamped in adjusted position. By means of these adjustable extensions the effective length of the harrow attachment may be varied according to the width of the strip worked by the disk harrow.

The harrow attachment is adjustably connected to the beam of the disk harrow so that it may be caused to operate more or less deeply upon the soil as it is left by the disk harrow. For this purpose a bracket 18 is bolted to the rear end of the main beam 5 of the disk harrow, and a hand lever 19 is pivoted thereto at 20, said lever being extended beyond its pivotal point into an arm 21 which carries the harrow attachment. A pair of slotted bracket plates 22, 23, are adjustably bolted to the main beam of the harrow attachment, and an arm 24 is bolted to one of said brackets, and adjustably bolted at 25 to the end of the arm 21, a series of holes 26 providing for suitable adjustment. A cross-brace 27 is bolted to the arm 24 and bracket 22 at 28 and to arm 21 at 29, so that the position of the harrow attachment relative to arm 21 is fixed. The bracket 18 carries an arcuate rack 30 concentric with the pivotal point 20 of the hand lever, and the pawl 31 mounted on the hand lever coöperates with the rack to maintain the hand lever in adjusted position. In order to relieve the harrow attachment beam of strain it is provided with a pair of attaching plates 32, 32, near its opposite ends which receive hooks 33, 33, attached to chains 34, 34, by means of which instrumentalities the ends of the harrow attachment are adjustably connected to the disk harrow frame at any suitable points, adjustment being effected by the selection of the link which is directly attached to the frame.

My invention provides a tooth harrow, the penetration of which may be readily adjusted, and the length of which may be adjusted to correspond to the effective length of the disk harrow to which it is adjusted, and the teeth of the harrow may be adjusted according to the depth and character of the trough formed by the disk harrow while the whole construction performs the function of the usual pin harrow without the necessity of using a separate device for this purpose.

I claim:

1. In a device of the class described, a transverse beam carrying ground working devices, a bracket having an arcuate rack adapted to be attached to the frame of a disk harrow, a hand lever adjustably pivoted on said bracket and carrying said transverse beam and a pawl on said hand lever coöperating with said rack.

2. In a device of the class described, a transverse beam having ground working tools thereon, a bracket adapted to be attached to the frame of a disk harrow and having an arcuate rack thereon, a hand lever pivoted on said bracket and having an arm 21 extending therefrom, a pawl on the hand lever coöperating with the rack, an arm 24 and brace 27 connected to arm 21 and to said transverse beam.

3. In a device of the class described, a transverse beam having ground working tools applied thereto, a bracket adapted to be attached to the frame of a disk harrow, a hand lever 19 adjustably pivoted on the bracket and having an arm 21, an arm 24 secured to the transverse beam at one end and adjustably secured to the arm 21 at the other, and a brace 27 connecting said transverse beam and arm 21.

4. In a device of the class described, a transverse beam, a series of pins extending through said beam, a bracket adapted to be secured to the frame of the disk harrow, a hand lever pivotally mounted on the bracket, a rack on said bracket and a pawl on the hand lever engaging the rack, an arm on said lever connected to the beam, and chains connected respectively to the opposite ends of the beam, and adapted to be connected to the frame of the disk harrow.

GEORGE W. LOCKHART.